(12) United States Patent
Niwa (10) Patent No.: US 7,712,561 B2
(45) Date of Patent: May 11, 2010

(54) DRIVING WHEEL STRUCTURE FOR MOTOR VEHICLE

(75) Inventor: Tomohiko Niwa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 190 days.

(21) Appl. No.: 11/995,697

(22) PCT Filed: Mar. 6, 2007

(86) PCT No.: PCT/IB2007/000535

§ 371 (c)(1),
(2), (4) Date: Jan. 15, 2008

(87) PCT Pub. No.: WO2007/116252

PCT Pub. Date: Oct. 18, 2007

(65) Prior Publication Data

US 2008/0223638 A1    Sep. 18, 2008

(30) Foreign Application Priority Data

Mar. 31, 2006    (JP) .............................. 2006-098253

(51) Int. Cl.
  *B60K 7/00* (2006.01)
(52) U.S. Cl. .................................................. 180/65.51
(58) Field of Classification Search ............... 180/65.51, 180/65.6, 298, 55, 61, 65.5, 65.1
  See application file for complete search history.

(56) References Cited

U.S. PATENT DOCUMENTS 6,698,313 B2 * 3/2004 Gaffney et al. ............ 74/665 N
2005/0056471 A1 * 3/2005 Kurata ....................... 180/65.5
2006/0054368 A1 * 3/2006 Varela ........................ 180/65.5
2006/0225931 A1 * 10/2006 Kurata ....................... 180/65.5

FOREIGN PATENT DOCUMENTS

| DE | 197 09 579 | 9/1998 |
|---|---|---|
| EP | 0 878 332 | 11/1998 |
| JP | 10-258642 | 9/1998 |
| JP | 10-338009 | 12/1998 |
| JP | 2004-90822 | 3/2004 |

(Continued)

*Primary Examiner*—Paul N Dickson
*Assistant Examiner*—Erez Gurari
(74) *Attorney, Agent, or Firm*—Oblon, Spivak, McClelland, Maier & Neustadt, L.L.P.

(57) ABSTRACT

A driving wheel structure (100) for a motor vehicle employing an in-wheel motor arrangement includes first (105) and second (108) electric motors for generating drive torques to rotate a wheel (102), a first support member attached to the vehicle body for supporting the first motor on a vehicle body, and a second support member attached to the vehicle body for supporting the second motor on the vehicle body. When the wheel (102) is rotated in one direction by the first motor (105), a reaction torque (F1) is induced in the first support member by the drive torque of the first motor (105) that applies a down-ward bias force (F1) to the wheel (102). When the wheel (102) is rotated in said one direction by the second motor (108), a reaction torque (F2) is induced in the second support member by the drive torque of the second motor that applies an upward bias force (F2) to the wheel (102).

19 Claims, 5 Drawing Sheets

FOREIGN PATENT DOCUMENTS

| | | |
|---|---|---|
| JP | 2005-33854 | 2/2005 |
| JP | 2005-119454 | 5/2005 |
| JP | 2005 119548 | 5/2005 |
| JP | 2005 239080 | 9/2005 |
| JP | 2006-130986 | 5/2006 |
| WO | WO 2006/062125 A1 | 6/2006 |

* cited by examiner

| | ROTATING DIRECTION OF FIRST MOTOR | ROTATING DIRECTION OF SECOND MOTOR | LOCATION OF MOMENTARY CENTERS IN VEHICULAR FRONT-REAR DIRECTION |
|---|---|---|---|
| A | SAME AS WHEEL (COAXIAL MOTOR) | SAME AS WHEEL (COAXIAL MOTOR) | |
| B | SAME AS WHEEL (GEAR MECHANISM WITH COUNTER GEAR) | SAME AS WHEEL (COAXIAL MOTOR) | LYING OPPOSITELY FROM EACH OTHER WITH RESPECT TO AXLE SHAFT (∴ MOTORS ROTATE IN THE SAME DIRECTION) |
| C | SAME AS WHEEL (COAXIAL MOTOR) | SAME AS WHEEL (GEAR MECHANISM WITH COUNTER GEAR) | |
| D | SAME AS WHEEL (GEAR MECHANISM WITH COUNTER GEAR) | SAME AS WHEEL (GEAR MECHANISM WITH COUNTER GEAR) | |
| E | OPPOSITE TO WHEEL (GEAR MECHANISM WITH NO COUNTER GEAR) | OPPOSITE TO WHEEL (GEAR MECHANISM WITH NO COUNTER GEAR) | |
| F | SAME AS WHEEL (COAXIAL MOTOR) | OPPOSITE TO WHEEL (GEAR MECHANISM WITH NO COUNTER GEAR) | LYING AT THE SAME SIDE WITH RESPECT TO AXLE SHAFT (∴ MOTORS ROTATE IN OPPOSITE DIRECTIONS) |
| G | SAME AS WHEEL (GEAR MECHANISM WITH COUNTER GEAR) | OPPOSITE TO WHEEL (GEAR MECHANISM WITH NO COUNTER GEAR) | |
| H | OPPOSITE TO WHEEL (GEAR MECHANISM WITH NO COUNTER GEAR) | SAME AS WHEEL (COAXIAL MOTOR) | |
| I | OPPOSITE TO WHEEL (GEAR MECHANISM WITH NO COUNTER GEAR) | SAME AS WHEEL (GEAR MECHANISM WITH COUNTER GEAR) | |

FIG. 5

DRIVING WHEEL STRUCTURE FOR MOTOR VEHICLE

BACKGROUND OF THE INVENTION

1. Field of the Invention

The present invention relates generally to a driving wheel structure for a motor vehicle employing an in-wheel motor and, more particularly, to a compact driving wheel structure for a motor vehicle that can afford to have a high freedom in design while realizing a function of high performance suspension.

2. Background of the Invention

Conventionally, driving wheel structures for a motor vehicle employing an in-wheel motor arrangement are known in the art, one example of which being disclosed in Japanese Patent Application Publication No. JP-A-2005-119548.

Japanese Patent Application Publication No. JP-A-2005-119548 describes a suspension device and a suspension arm arrangement used in a driving wheel employing an in-wheel motor structure to provide an anti-dive control, a damping control and an anti-roll control by virtue of a motor drive control.

Taking advantage of the up-down movement (rising and sinking) of a vehicle body that occurs when accelerating or decelerating, the conventional device described in Japanese Patent Application Publication No. JP-A-2005-119548 is adapted to induce a damping action or an anti-roll action by performing acceleration and deceleration in response to the vehicle body up-down movement or a rolling movement. However, this device fails to resolve the problem that the vehicle body undergoes an up-down movement when accelerating and decelerating.

As a technique for suppressing the up-down movement during acceleration and deceleration to thereby optimize a pitch attitude, it may be theoretically contemplated that, by elongating a trailing arm for instance, the momentary center of rotation (swing movement) of a body-side member (suspension arm) to which the stator of a motor is attached may be located as far away as possible from the corresponding driving wheel in the longitudinal direction of the vehicle at the time of braking or driving. Another theoretically feasible solution may be to keep the momentary rotation center as close to the ground as possible (at least lower than an axle shaft).

If, however, the mounting position of the suspension arm on the vehicle body or the length of the suspension arm is restricted, the freedom in the layout design is degraded and the space utilizing efficiency is reduced as well.

Further, in the conventional device described in Japanese Patent Application Publication No. JP-A-2005-119548, due to its structural features, the force acting in the longitudinal direction is necessarily applied to the vehicle body during a damping control process, possibly accompanied with unintended acceleration, deceleration or vibration.

Moreover, in the conventional device described in Japanese Patent Application Publication No. JP-A-2005-119548, due to its structural features, a yaw moment necessarily acts on the vehicle body during an anti-roll control process, resulting in a possible movement of the motor vehicle in an unintended direction.

SUMMARY OF THE INVENTION

The present invention provides a compact driving wheel structure for a motor vehicle that can afford to have a high freedom in design and realize a function of high performance suspension.

A driving wheel structure for a motor vehicle employing an in-wheel motor arrangement in accordance with a first aspect of the invention, includes: first and second electric motors for generating drive torques to rotate a wheel; a first support member for supporting the first motor on a vehicle body; and a second support member for supporting the second motor on the vehicle body, wherein the first support member is attached to the vehicle body in such a manner that, when the wheel is rotated in one direction by the first motor, a reaction torque is induced in the first support member by the drive torque of the first motor and acts to apply a downwardly biasing force to the wheel, and wherein the second support member is attached to the vehicle body in such a manner that, when the wheel is rotated in the one direction by the second motor, a reaction torque is induced in the second support member by the drive torque of the second motor and acts to apply an upwardly biasing force to the wheel.

In accordance with the first aspect of the invention, two motors are provided to brake and drive the wheel and, when the wheel is driven (rotated in same direction) by these motors, the forces exerted on the wheel in the vertical direction of the vehicle by means of the motor reaction torques are oriented in opposite up-down directions at the two motors. Thus, while the wheel is rotated under the control of the two motors, it is possible to generate a wheel-lifting force and a wheel-lowering force at an arbitrary ratio independently of the braking and driving control of the wheel.

Consequently, in the driving wheel structure in accordance with the first aspect of the invention, if the driving force of the motor that serves to exert an upwardly biasing force on the wheel in the wheel driving process is kept greater than the driving force of the remaining motor, it becomes possible to apply the upwardly biasing force to the wheel while allowing the wheel to be driven.

Similarly, in the driving wheel structure in accordance with the first aspect of the invention, if the driving force of the motor that serves to exert a downwardly biasing force on the wheel in the wheel driving process is kept greater than the driving force of the remaining motor, it becomes possible to apply the downwardly biasing force to the wheel while allowing the wheel to be driven.

The driving wheel structure for the motor vehicle in accordance with the first aspect of the invention can further include a controller for controlling actuation of the first and second motors wherein the controller is adapted to control the actuation of the first and second motors in such a manner that, when the motor vehicle makes a straight drive, the downwardly biasing force applied to the wheel by the reaction torque of the first support member which is induced by the drive torque of the first motor becomes equal to the upwardly biasing force applied to the wheel by the reaction torque of the second support member which is induced by the drive torque of the second motor. In such a case, since the wheel is prevented from moving vertically while driven, it is possible to suppress the rising and sinking of the vehicle body at the time of vehicle acceleration or deceleration.

Further, the driving wheel structure for the motor vehicle in accordance with the first aspect of the invention can include a controller for controlling actuation of the first and second motors, wherein the controller is adapted to control the actuation of the first and second motors in such a manner that, when damping an up-down movement of the vehicle body in a vehicle travel process, the drive torques generated by the first and second motors for rotating the wheel act in opposite directions from each other with respect to the wheel; and the controller is also adapted to control the actuation of the first and second motors in such a manner that, responsive to the up-down movement of the vehicle body in the vehicle travel process, the oppositely acting drive torques are simultaneously reversed in their acting directions. In this case, it is possible to realize the function of a shock absorber by using the control for the up-down movement of the vehicle body.

Further, the driving wheel structure for the motor vehicle in accordance with the first aspect of the invention can include a controller for controlling actuation of the first and second motors, wherein the controller is adapted to control the actuation of the first and second motors in such a manner that the drive torques generated by the first and second motors for rotating the wheel act in an opposite direction from each other with respect to the wheel and further in such a manner that, when a motor vehicle undergoes a turning movement, a downwardly biasing force is exerted on the wheel if the wheel serves as an outer turning wheel while an upwardly biasing force is exerted on the wheel if the wheel serves as an inner turning wheel. In this case, it is possible to realize an anti-roll control by using the control for the up-down movement of the vehicle body.

As noted above, in accordance with the first aspect of the invention, the wheel can be selectively moved up or down in the wheel driving process without affecting the wheel drive control by properly controlling the ratio of the driving forces generated by the two motors depending on the condition of a motor vehicle. This makes it possible not only to suppress the up-down movement of the vehicle body but also to intentionally lift up or lower down the vehicle body, thereby realizing the function of a high performance suspension in a compact construction.

In a driving wheel structure for a motor vehicle employing an in-wheel motor arrangement in accordance with a second aspect of the invention, the first and second motors are adapted to be driven in one and the same direction when rotating the wheel in the one direction; the first support member includes an arm-shaped member having one end to which a stator of the first motor is secured and the other end pivotally attached to the vehicle body; the second support member includes an arm-shaped member having one end to which a stator of the second motor is secured and the other end pivotally attached to the vehicle body; and the first and second support members are respectively disposed in such a fashion that the momentary centers of swing movement of the first and second support members lie oppositely from each other with respect to an axle shaft of the wheel in the longitudinal direction of the vehicular.

In accordance with the second aspect of the invention, the first and second motors can be driven in one and the same direction when rotating the wheel in one direction, in the exemplary following manner. A) The first and second motors may be all coaxial motors provided on the axle shaft. B) The first and second motors may have output shafts arranged to be positioned offset from the axle shaft of the wheel respectively and may be provided with power transmission mechanisms for transferring the drive torques generated in the output shafts to the axle shaft, each of the power transmission mechanisms including a first gear affixed to the output shaft of a motor, a second gear secured to the axle shaft in a non-engaging relationship with the first gear and a third gear engaging with the first and second gears. C) The first and second motors may have output shafts arranged to be positioned offset from the axle shaft of the wheel respectively and may be provided with power transmission mechanisms for transferring the drive torques generated in the output shafts to the axle shaft, each of the power transmission mechanisms including a first gear affixed to the output shaft of a motor and a second gear secured to the axle shaft and engaging with the first gear.

In accordance with the second aspect of the invention, when the wheel is rotated in one direction by the two motors, the forces exerted on the wheel in the vertical direction of the vehicle by means of the motor reaction torques can be oriented in the opposite up-down directions at the two motors.

Furthermore, in accordance with the second aspect of the invention, in the case where the respective motors are provided with the power transmission mechanisms as in the above-noted instances B) and C), it is preferred that the first support member is comprised of a hollow member and the power transmission mechanism of the second motor is accommodated within the first support member. This makes it possible to realize an even more compact construction.

In a driving wheel structure for a motor vehicle employing an in-wheel motor arrangement in accordance with a third aspect of the invention, the first and second motors are adapted to be driven in different directions when rotating the wheel in the one direction; the first support member includes an arm-shaped member having one end to which a stator of the first motor is secured and the other end pivotally attached to the vehicle body; the second support member includes an arm-shaped member having one end to which a stator of the second motor is secured and the other end pivotally attached to the vehicle body; and the first and second support members are respectively disposed in such a fashion that the momentary centers of swing movement of the first and second support members lie at one and the same side with respect to an axle shaft of the wheel in the longitudinal direction of the vehicle.

In accordance with the third aspect of the invention, the first and second motors can driven in different directions when rotating the wheel in one direction, in the exemplary following manner. 1) The first motor may be a coaxial motor provided on the axle shaft of the wheel, whereas the second motor may have an output shaft arranged to be positioned offset from the axle shaft of the wheel and may be provided with a power transmission mechanism for transferring the drive torque generated in the output shaft to the axle shaft, the power transmission mechanism including a first gear affixed to the output shaft of the second motor and a second gear secured to the axle shaft and engaging with the first gear. 2) The first motor may have an output shaft arranged to be positioned offset from the axle shaft of the wheel and may be provided with a first power transmission mechanism for transferring the drive torque generated in the output shaft of the first motor to the axle shaft, the first power transmission mechanism including a first gear affixed to the output shaft of the first motor, a second gear secured to the axle shaft in a non-engaging relationship with the first gear and a third gear engaging with the first and second gears, whereas the second motor may have an output shaft arranged to be positioned offset from the axle shaft of the wheel and may be provided with a second power transmission mechanism for transferring the drive torque generated in the output shaft of the second motor to the axle shaft, the second power transmission mechanism including a fourth gear affixed to the output shaft of the second motor and a fifth gear secured to the axle shaft and engaging with the fourth gear.

In accordance with the third aspect of the invention, when the wheel is rotated in one direction by the two motors, the forces exerted on the wheel in the vertical direction of the vehicle by means of the motor reaction torques can be oriented in the opposite up-down directions at the two motors.

Furthermore, in accordance with the third aspect of the invention, in the above-noted instance 1), the first support member is comprised of a hollow member and the power transmission mechanism is accommodated within the first support member. In the above-noted instance 2), a) the first support member is comprised of a hollow member and the second power transmission mechanism is accommodated within the first support member, or b) the second support member is comprised of a hollow member and the first power transmission mechanism is accommodated within the second support member. These arrangements are preferred because they can realize an even more compact construction.

In accordance with the present invention, it is possible to provide a compact driving wheel structure for a motor vehicle that can afford to have a high freedom in design while realizing a function of high performance suspension.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

In the following, the best mode for carrying out the invention will be described with reference to the accompanying drawings in terms of exemplary embodiments. No detailed description will be given to the basic conception, major hardware construction, operational principle and basic control method of an in-wheel motor structure, because they are already known to those skilled in the art.

Now, a driving wheel structure for a motor vehicle in accordance with a first embodiment of the present invention will be set forth with reference to FIGS. 1 through 3.

Figure 1:
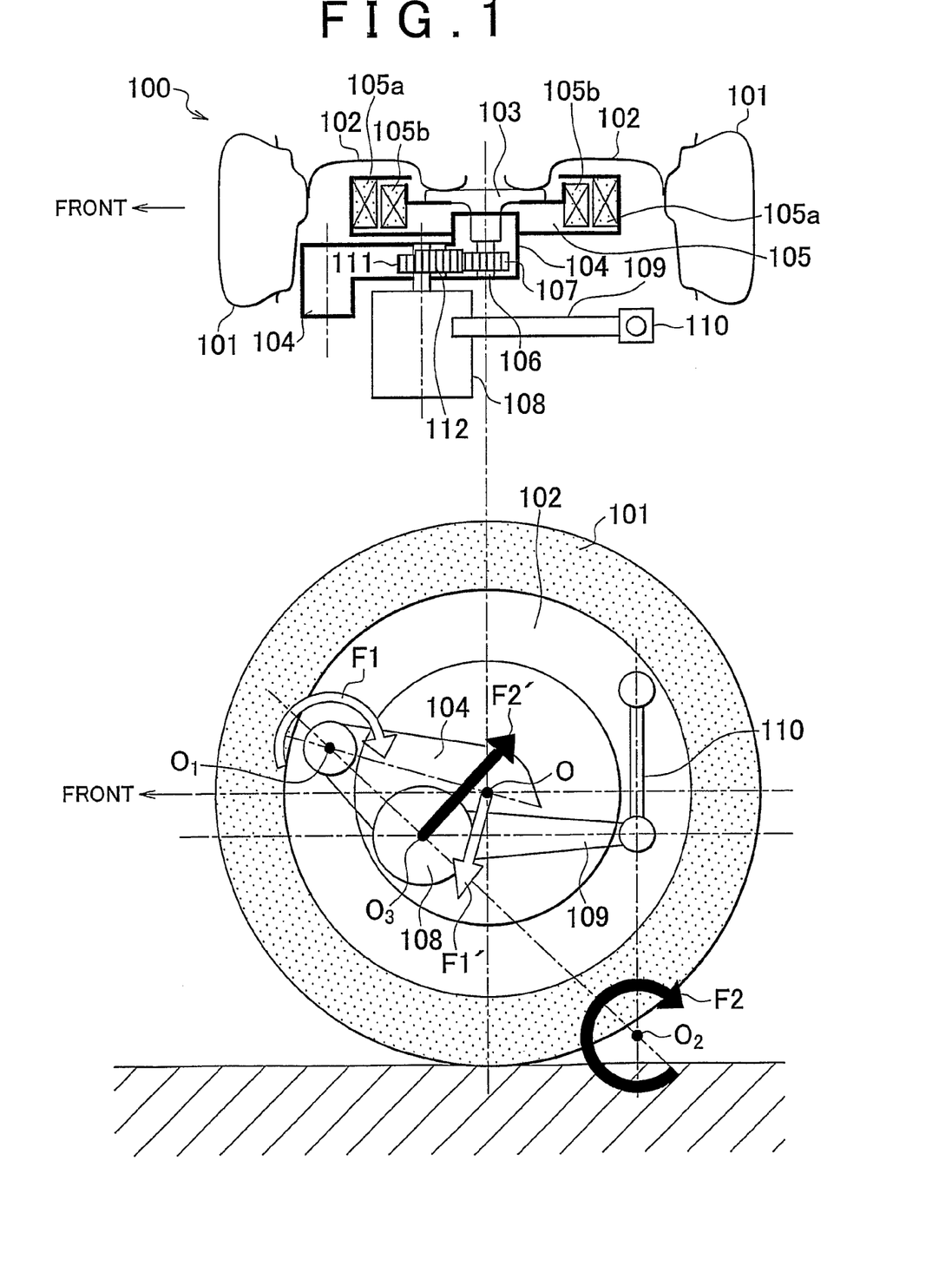
FIG. 1 is a combination of a cross-sectional view and a side elevational view observed from the inner side of a motor vehicle, illustrating a driving wheel structure in accordance with a first embodiment of the present invention.

Referring first to FIG. 1, there will be described the construction of a driving wheel structure 100 of the present embodiment. FIG. 1 is a combination of a transverse sectional view and a side elevational view observed from the inner side of a motor vehicle, illustrating the driving wheel structure 100 of the present embodiment. In this figure, only one of the right side driving wheels is shown. It does not matter whether the driving wheel is a front wheel or a rear wheel.

The driving wheel structure 100 includes a wheel 102, on the outer periphery of which a tire 101 is mounted in a conventional manner. The wheel 102 is supported on a carrier 104 by means of a hub 103 fixedly secured to the wheel 102 in such a manner that it can rotate about an axle shaft.

Affixed to the carrier 104 is a stator 105a of a first electric motor 105 whose rotor 105b is secured to the hub 103, the first electric motor 105 being comprised of a coaxial motor.

An axle shaft 106 is secured to the hub 103 and extends into the carrier 104. A gear 107 is affixed to the axle shaft 106 within the hollow space of the carrier 104.

The vehicle body side end of the carrier 104 is attached to a vehicle body (no attachment portion shown in the drawings) in such a manner that the carrier 104 is swingable with respect to the vehicle body and thus the wheel 102 is movable in an up-down direction of a motor vehicle. In a nutshell, the carrier 104 is constructed to serve as a trailing arm in the driving wheel structure 100.

Unlike the conventional structure, the driving wheel structure 100 in accordance with the present embodiment further includes a second electric motor 108 in addition to the first motor 105. The second motor 108 is attached to the vehicle body through a first torque arm 109 and a second torque arm 110.

One end of the first torque arm 109 is affixed to a stator of the second motor 108, while the other end thereof is pivotally coupled to one end of the second torque arm 110. The other end of the second torque arm 110 is pivotally connected to the vehicle body.

In other words, the second motor 108 is supported on the vehicle body by a four-bar linkage that includes the carrier 104, the first torque arm 109 and the second torque arm 110.

A gear 111 is provided at the output shaft of the second motor 108. The gear 111 is accommodated within the hollow space of the carrier 104.

Also provided within the hollow space of the carrier 104 is a counter gear 112 rotatably supported on a shaft (not shown) and meshed with both of the gears 107 and 111. The presence of the counter gear 112 ensures that the output shaft of the second motor 108 and the axle shaft 106 rotate in the same direction.

In the driving wheel structure 100 in accordance with the present embodiment, three gears, i.e., the gears 107, 111 and 112 disposed within the hollow space of the carrier 104 cooperate to form a speed reduction mechanism. The carrier 104 serves as a gear case for the gears 107, 111 and 112.

The torque generated in the output shaft of the second motor 108 is transferred to the axle shaft 106, in which the rotational speed of the output shaft is reduced in proportion to a reduction ratio determined by the gear ratios between three gears, i.e., the gears 107, 111 and 112. An arbitrary reduction ratio for the second motor 108 can be obtained by properly setting the gear ratios between three gears, i.e., the gears 107, 111 and 112.

In the driving wheel structure 100 of the construction as noted above, if the wheel 102 is accelerated in a vehicle-forward-movement direction by the first motor 105 and the second motor 108, a reaction torque F1 of the carrier 104 induced by the drive torque of the first motor 105 develops about a momentary rotation center $O_1$, which coincides with an attachment point of the carrier 104 to the vehicle body, as indicated by a white arrow in the side elevational view of FIG. 1. In the driving wheel structure 100, the momentary rotation center $O_1$ of the reaction torque F1 forward of the axis O of the axle shaft (namely, to the left side in FIG. 1). Thus, the reaction torque F1 acts as a downwardly biasing force F1' that pushes down the carrier 104 along the vertical direction of the vehicle.

In the meantime, a reaction torque F2 of the first torque arm 109 induced by the drive torque of the second motor 108 develops about a momentary rotation center $O_2$, which coincides with a intersection point of an extension part of a line joining the attachment point of the carrier 104 to the vehicle body with a center $O_3$ of the second motor 108 and an extension line of the second torque arm 110, as indicated by a black arrow in the side elevational view of FIG. 1. This is because the second motor 108 is supported on the vehicle body by means of the four-bar linkage noted above. In the driving wheel structure 100, the momentary rotation center $O_2$ of the reaction torque F2 lies rearward of the axis O of the axle shaft (namely, to the right side in FIG. 1). Thus, the reaction torque F2 acts as an upwardly biasing force F2' that lifts the carrier 104 along the vertical direction of the vehicle.

As set forth above, in the driving wheel structure 100, at the time when the wheel 102 is rotated in a vehicle-accelerating direction, the momentary rotation centers $O_1$ and $O_2$ of the motor-drive-responsive reaction torques lie oppositely from each other with respect to the axis O of the axle shaft in the longitudinal direction of the vehicle. This means that, when the wheel 102 is rotated in a vehicle-accelerating direction, the reaction forces developed by the motor-drive-responsive reaction torques are exerted on the carrier 104 opposite to each other in the vertical direction of the vehicle at the first motor 105 and the second motor 108.

Stated differently, by disposing the momentary rotation centers $O_1$ and $O_2$ in this manner, the first motor 105 of the driving wheel structure 100 can be used as a motor for applying a downward bias force to the carrier 104 when the vehicle accelerates. Likewise, the second motor 108 can be utilized as a motor for applying an upwardly biasing force to the carrier 104 in the event of vehicle acceleration.

As a consequence, in the driving wheel structure 100, the first motor 105 and the second motor 108 can be controlled in such a fashion that, when the vehicle accelerates or decelerates, for example, the force applied to the carrier 104 in the vertical direction of the vehicle by the actuation of the first motor 105 and the by the actuation of the second motor 108 counteract and offset each other into a zero difference value. This helps to suppress the up-down movement (rising and sinking) of the vehicle body during vehicle acceleration or deceleration, thereby stabilizing the posture of the motor vehicle.

Furthermore, in the driving wheel structure 100, the first motor 105 may be actuated to rotate the wheel 102 in one direction and the second motor 108 may be actuated to rotate the wheel 102 in the other direction. This ensures that the force applied to the carrier 104 by the reaction torque F1 of the first motor 105 and the force applied to the carrier 104 by the reaction torque F2 of the second motor 108 are oriented in the same direction. In other words, if the first motor 105 and the second motor 108 are actuated with a same driving force so as to rotate the wheel 102 in opposite directions, it becomes possible to lift or lower the vehicle body without accelerating or decelerating the motor vehicle.

If this operational principle is utilized, for example, if the reaction forces F1' and F2' of the first motor 105 and the second motor 108 are caused to act in such a manner that the vehicle body moves up and down in proportion to the relative speed between the carrier 104 and the vehicle body, which is obtained by, e.g., monitoring the time-dependent variation of the vehicle height detected by a vehicle height sensor, it is possible to acquire the same damping action against the up-down movement of the vehicle body as performed by a typical shock absorber. In this way, if the driving wheel structure 100 is endowed with a damping function for suppressing the vibration of a unsprung mass, there is no need to employ the typical shock absorber, which in turn makes it possible to reduce the width and the height of the wheel housing. This greatly improves the freedom of design for, e.g., the height of an engine hood, the space of rear seats and the like.

Moreover, depending on the magnitude and the direction of a lateral acceleration, a steering torque or the like, the vehicle body is lowered down by controlling the first motor 105 and the second motor 108 to apply an upwardly biasing force to the carrier 104 if the driving wheel serves as an inner turning wheel in the process of vehicle turning operation, and the vehicle body is lifted up by controlling the first motor 105 and the second motor 108 to apply a downwardly biasing force to the carrier 104 if the driving wheel serves as an outer turning wheel in the process of vehicle turning operation. This enables the vehicle body to remain level with respect to the ground during the turns, thereby realizing a function equivalent to that of a stabilizer. This enhances stability of the vehicle in turns.

Figure 2:
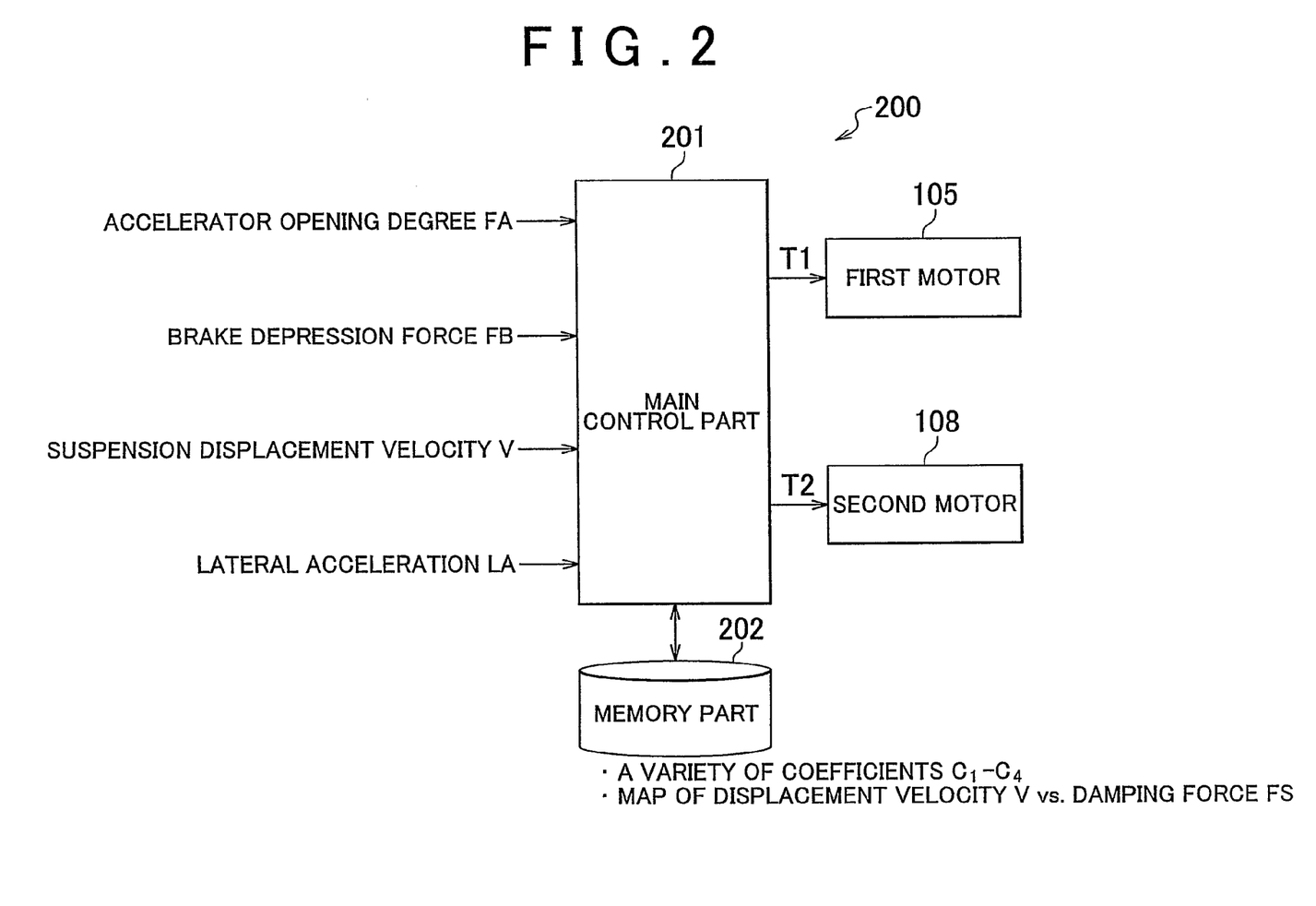
FIG. 2 shows a schematic configuration of a motor control circuit employed in the driving wheel structure of the first embodiment of the present invention.
Figure 3:
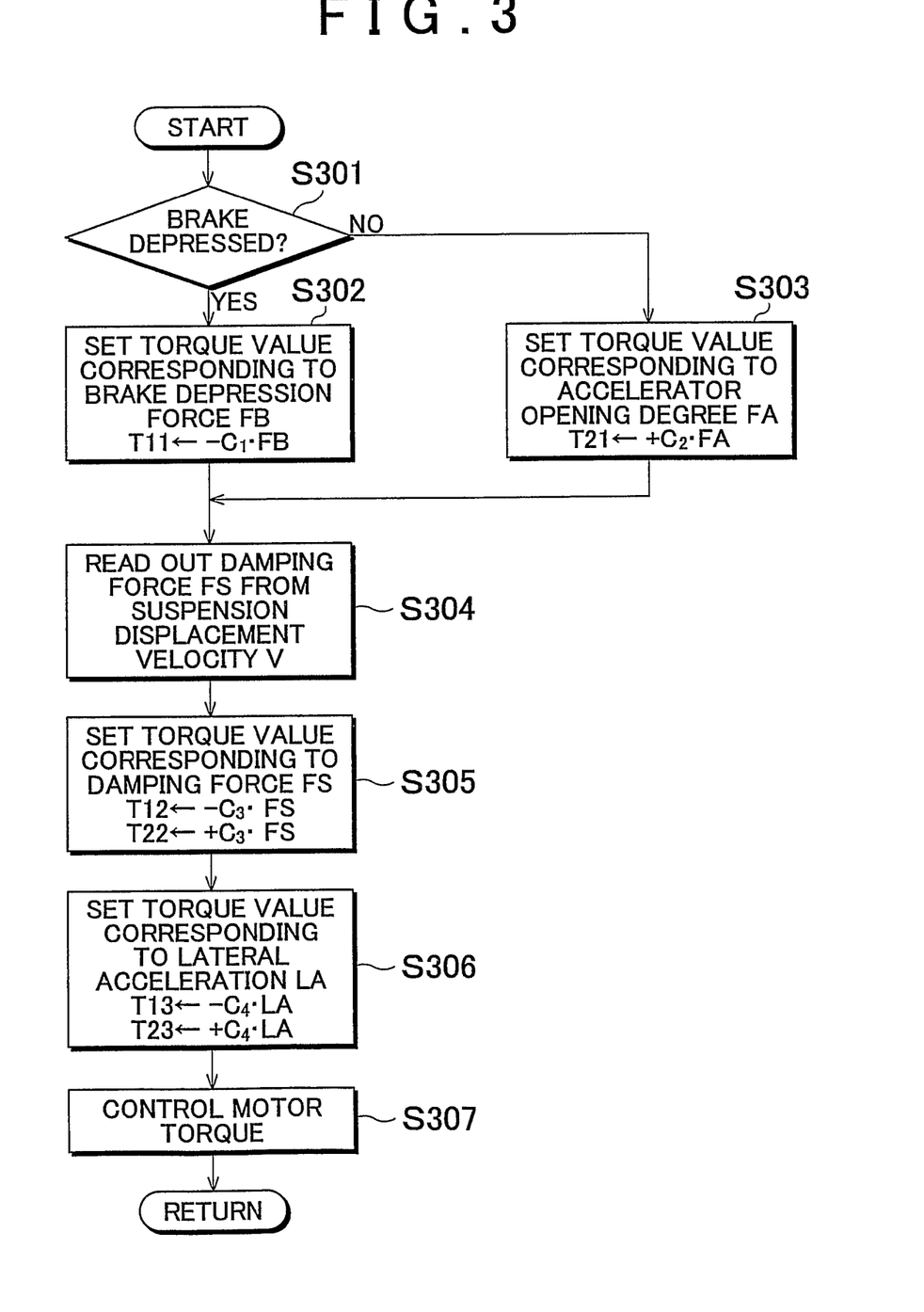
FIG. 3 is a flowchart illustrating the flow of a motor drive control in the driving wheel structure in accordance with the first embodiment of the present invention.

Referring next to FIGS. 2 and 3, the flow of a motor drive control in the driving wheel structure 100 in accordance with the present embodiment will be described. FIG. 2 schematically shows one exemplary motor control circuit employed in the driving wheel structure 100, and FIG. 3 is a flowchart illustrating one exemplary flow of a motor drive control in the driving wheel structure 100.

In the present embodiment, the motor control circuit includes a main controller 201 that controls the energization or deenergization of the first motor 105 and the second motor 108, and a memory 202 that stores and retains coefficients and the like needed for computation in the main controller 201 (see FIG. 2).

Further, the main controller 201 is supplied with parameters indicative of vehicle operating conditions, including an accelerator opening degree FA detected by an accelerator opening degree sensor for instance, a brake depression force FB detected by a brake sensor for instance, a suspension displacement velocity V which is a time-dependent variation of the vehicle height detected by a vehicle height for instance, and a lateral acceleration LA detected by a lateral acceleration (lateral G) sensor for instance (see FIG. 2).

Based on the brake depression force FB, the main controller 201 first determines whether the driver has depressed the brake pedal (S301 in FIG. 3).

If the brake pedal is depressed ("YES" at S301), the brake depression force FB is multiplied by a prescribed coefficient "−C1" to compute a torque value, wherein the torque value will be set as a control target torque value T11 for the first motor 105 (S302). In this regard, the coefficient "−C1" is the one pre-stored in the memory part 202.

If the brake pedal is not depressed ("NO" at S301), the accelerator opening degree FA is multiplied by a prescribed coefficient "+C2" to compute a torque value, wherein the torque value will be set as a control target torque value T21 for the second motor 108 (S303). In this regard, the coefficient "+C2" is the one pre-stored in the memory part 202.

Then, the main controller 201 reads out the value of a damping force FS corresponding to the suspension displacement velocity V, where the damping force FS is obtained by applying the suspension displacement velocity V to a map pre-stored in the memory part 202 for defining the correlation between the suspension displacement velocity V and the damping force FS (S304). The damping force FS thus read is multiplied by a prescribed coefficient "−C3" to compute a torque value and the torque value will be set as a control target torque value T12 for the first motor 105, and the damping force FS thus read is multiplied by a prescribed coefficient "+C3" (where |−C3|=|+C3|) to compute a torque value which will be set as a control target torque value T22 for the second motor 108 (S305). In this regard, the coefficients "−C3" and "+C3" are the ones pre-stored in the memory part 202.

Subsequently, in the main controller 201, the lateral acceleration LA is multiplied by a prescribed coefficient "−C4" to compute a torque value which will be set as a control target torque value T13 for the first motor 105, and the lateral acceleration LA is multiplied by a prescribed coefficient "+C4" (where |−C4|=|+C4|) to compute a torque value, wherein the torque value will be set as a control target torque value T23 for the second motor 108 (S306). In this regard, the coefficients "−C4" and "+C4" are the ones pre-stored in the memory part 202.

Finally, the main controller 201 drives and controls the first motor 105 and the second motor 108, based on the control target torque value T1 (=T11+T12+T13=C1·FB−C3·FS−C4·LA) for the first motor 105 and the control target torque value T2 (=T21+T22+T23=+C2·FA+C3·FS+C4·LA) for the second motor 108 computed in the above manner (S307).

As set forth above, in the present embodiment, two motors are provided in order to brake and drive the wheel. Further, the momentary rotation centers of the reaction torques induced by the two motors are disposed such that, when the wheel is braked or driven, reaction forces can be exerted on the carrier, which rotatably supports the wheel, in opposite up-down directions by the two motors. Thus, the driving wheel structure in accordance with the present embodiment is compact in construction and is able to lift or lower the vehicle body independently of the braking and driving control for the wheel. As a result, it is possible to suppress the up-down movement of the vehicle body by properly controlling the magnitude of the drive torques outputted from the two motors depending on the condition of a motor vehicle. In other words, as in the conventional case where a single motor is employed to brake and drive a wheel, the vehicle body is prevented from rising and sinking when driving and braking (regenerating).

Further, in the present embodiment, it becomes possible to lift and lower the vehicle body without resort to acceleration or deceleration of the motor vehicle, by controlling the rotational directions of the two motors in such a manner that the motor reaction forces exerted on the carrier rotatably supporting the wheel are all oriented in an upward direction or a downward direction. Accordingly, the driving wheel structure of the present embodiment alone realizes a damping function otherwise performed by a shock absorber and a posture control function otherwise carried out by an active suspension. This eliminates the need for a shock absorber, thus improving the freedom of design, while realizing the function of a high performance suspension.

In the embodiment described above, the driving wheel structure is configured such that, when the wheel is rotated in one direction by the two motors, the forces exerted on the wheel in the vertical direction of the vehicle by means of the motor drive torques are oriented in opposite up-down directions at the two motors. As one specific example of such construction, it has been described in the foregoing that the two motors 105 and 108 are rotated in the same direction as the rotational direction of the wheel 102 to drive the wheel 102 in one direction and further that the momentary rotation centers $O_1$ and $O_2$ of the support members 104, 109 and 110 at the time of swing movement of the latter lie oppositely from each other with respect to the axis O of the axle shaft of the driving wheel in the longitudinal direction of the vehicle (namely, $O_1$ at the front side and $O_2$ at the rear side of the motor vehicle). To this end, one wheel driving motor 105 is comprised of a coaxial motor, but the other wheel driving motor 108 is offset from the axle shaft and rotated in the same direction as the wheel under the action of a gear mechanism with a counter gear. Such description has been made for the purpose of illustration and therefore the present invention is not restricted to the foregoing embodiment.

To be more specific, the following two constructions may be employed to make sure that, when the wheel is rotated in one direction by the two motors, the forces exerted on the wheel in the vertical direction of the vehicle by means of the motor drive torques are oriented in opposite up-down directions at the two motors. One is a construction wherein the two motors are rotated in a common direction to drive the wheel in one direction and the momentary centers of swing movement of the respective support members lie oppositely from each other with respect to the axle shaft in the longitudinal direction of the vehicle. The other is a construction wherein the two motors are rotated in different directions to drive the wheel in one direction and the momentary centers of swing movement of the respective support members lie on the same side with respect to the axle shaft in the longitudinal direction of the vehicle.

Further, the following two constructions may be adopted to ensure that the wheel driving motor is rotated in the same direction as the rotational direction of the wheel when the wheel is rotated in one direction. One is to use a coaxial motor as the wheel driving motor. The other is to offset the wheel driving motor from the axle shaft, while allowing the gear on the output shaft of the motor to be operatively connected to the gear on the axle shaft via a counter gear. Conversely, if the motor is disposed offset from the axle shaft and if the gear on the output shaft of the motor is directly meshed with the gear on the axle shaft, the direction of rotation of the motor becomes opposite to the rotational direction of the wheel when the wheel is rotated in one direction.

Figure 4:
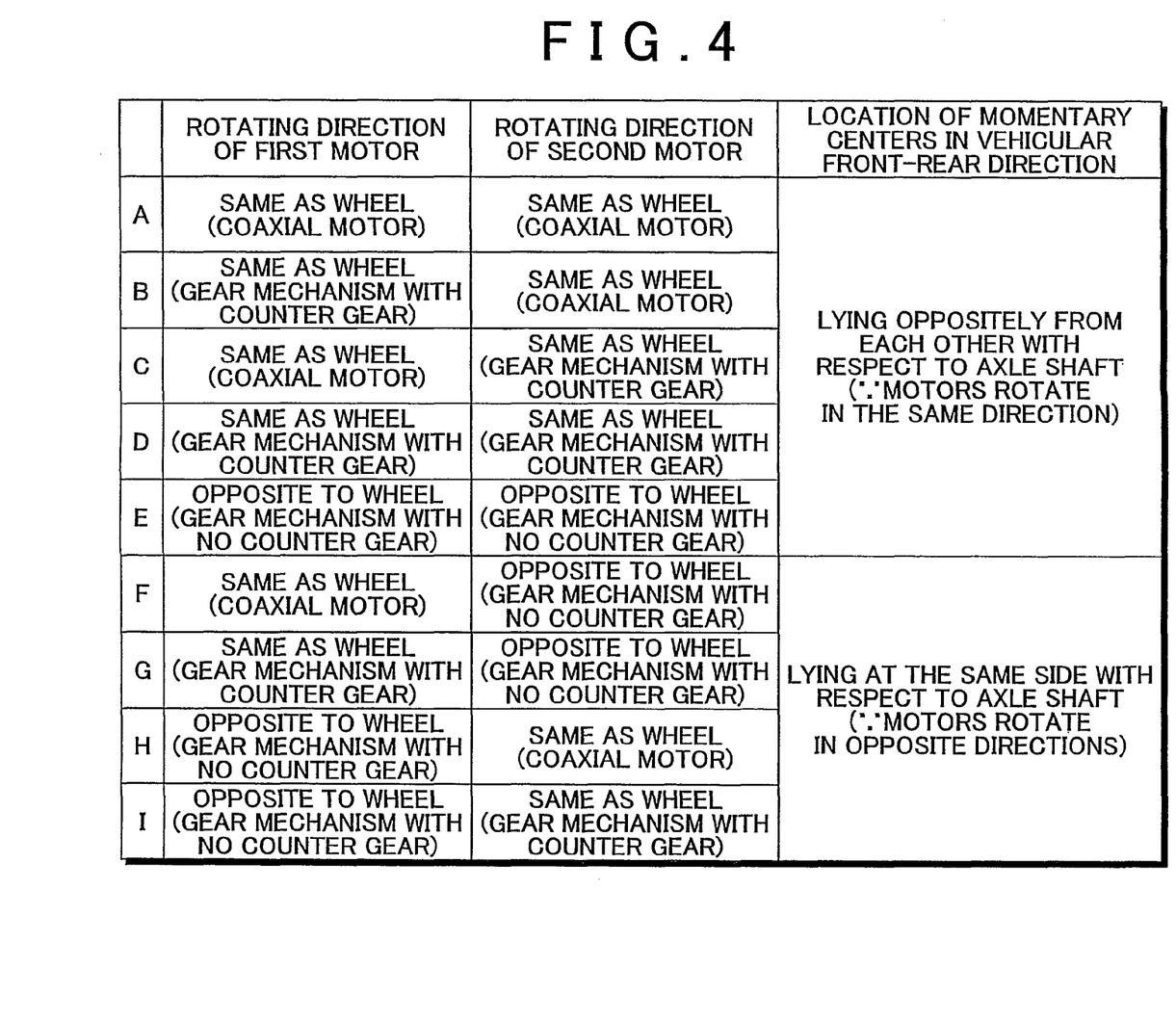
FIG. 4 illustrates exemplary construction patterns that can be employed in the driving wheel structure of the present invention.

Shown in FIG. 4 are exemplary construction patterns adoptable by the driving wheel structure of the present invention.

In cases A-E of FIG. 4 where the two motors are commonly rotated either in a same direction or a reverse direction as the wheel when the wheel is rotated in one direction, the momentary centers of swing movement of the respective motor support members lie opposite each other (at the front side and the rear side) with respect to the axle shaft in the longitudinal direction of the vehicle.

On the other hand, in cases F-I of FIG. 4 where the two motors are rotated in opposite directions when the wheel is rotated in one direction, the momentary centers of swing movement of the respective motor support members lie at one and the same side (at the front side or the rear side) with respect to the axle shaft in the longitudinal direction of the vehicle.

As is apparent to those skilled in the art, the embodiment described above amounts to the construction pattern of case C in FIG. 4.

Figure 5:
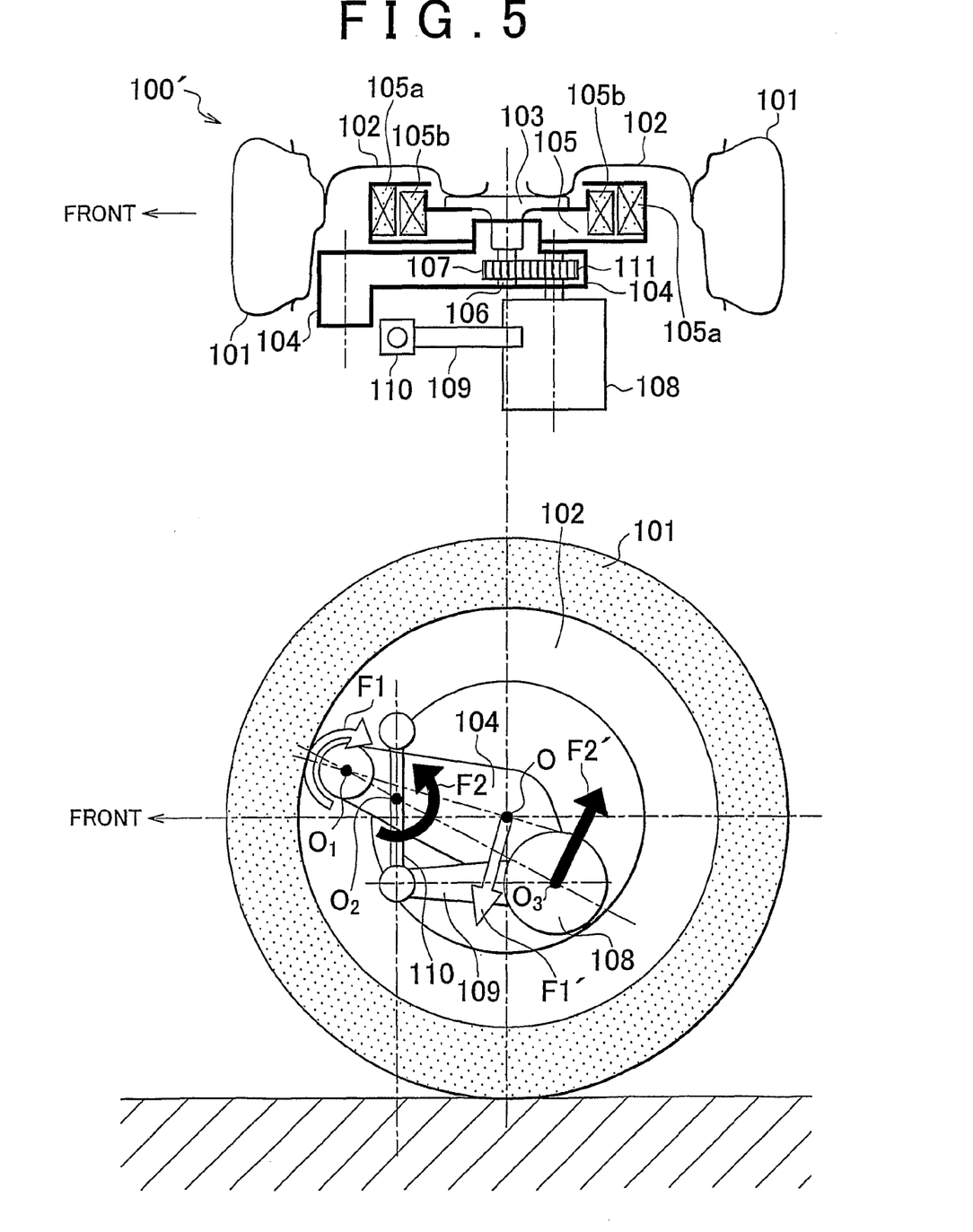
FIG. 5 is a combination of a cross-sectional view and a side elevational view observed from the inner side of a motor vehicle, illustrating a driving wheel structure in accordance with a second embodiment of the present invention.

Illustrated in FIG. 5 is a second embodiment of the present invention corresponding to the construction pattern of case F in FIG. 4, wherein the momentary centers of swing movement of the respective motor support members lie at one and the same side with respect to the axle shaft in the longitudinal direction of the vehicle.

In the embodiment shown in FIG. 5, the second motor 108 is disposed rearward of the axis O of the axle shaft in the longitudinal direction of the vehicle and the gear 111 on the output shaft of the second motor 108 is directly meshed with the gear 107 on the axle shaft 106. Thus, the wheel 102 and the second motor 108 rotate in opposite directions.

As a consequence, if the wheel 102 is accelerated in a vehicle-forward-movement direction by the first motor 105 and the second motor 108, the reaction torque F1 of the carrier 104 induced by the drive torque of the first motor 105 develops about the momentary rotation center, which coincides with the attachment point $O_1$ of the carrier 104 to the vehicle body, as indicated by a white arrow in the side elevational view of FIG. 5. In this driving wheel structure 100', the momentary rotation center $O_1$ of the reaction torque F1 is forward of the axis O of the axle shaft (namely, at the left side in FIG. 5). Thus, the reaction torque F1 acts as a downward bias force F1' that pushes the carrier 104 down along the vertical direction of the vehicle. This is the same as described in connection with FIG. 1.

On the other hand, in accordance with the embodiment shown in FIG. 5, the reaction torque F2 of the first torque arm 109 induced by the drive torque of the second motor 108 develops about the momentary rotation center, which coincides with the intersection point $O_2$ of a line joining the attachment point $O_1$ of the carrier 104 to the vehicle body with the center $O_3$ of the second motor 108 and a center line of the second torque arm 110, as indicated by a black arrow in the side elevational view of FIG. 5. This is because the second motor 108 is supported on the vehicle body by means of the four-bar linkage noted above. In this driving wheel structure 100', the momentary rotation center $O_2$ of the reaction torque F2 is forward of the axis O of the axle shaft (namely, at the left side in FIG. 5). Thus, the reaction torque F2 acts as an upward bias force F2' along the vertical direction of the vehicle, the upward bias force F2' being exerted on the second motor 108.

As can be seen in the foregoing, the driving wheel structure in accordance with the present invention may be constructed in any arbitrary form, provided the construction adopted ensures that, when the wheel is rotated in one direction by the two motors, the forces exerted on the wheel in the vertical direction of the vehicle by means of the motor drive torques are oriented in opposite up-down directions at the two motors.

The present invention can find its application in a driving wheel for a motor vehicle employing an in-wheel motor arrangement. The external appearance, weight, size and travel performance of the motor vehicle to which the present invention is applied does not matter.

The invention claimed is:

1. A driving wheel structure for a motor vehicle employing an in-wheel motor arrangement, comprising:
    a first electric motor and a second electric motor that generate drive torques to rotate a wheel;
    a first support member that supports the first motor on a vehicle body; and
    a second support member that supports the second motor on the vehicle body,
    wherein the first support member is attached to the vehicle body such that, when the wheel is rotated in one direction by the first motor, a first reaction torque is induced about a momentary center of swing movement of the first support member by the drive torque of the first motor and the first reaction torque applies a downward bias force to the wheel,
    wherein the second support member is attached to the vehicle body such that, when the wheel is rotated in said one direction by the second motor, a second reaction torque is induced about a momentary center of swing movement of the second support member by the drive torque of the second motor and the second reaction torque applies an upward bias force to the wheel, and
    wherein the momentary centers of swing movement of the first and second support members are each offset from an axle shaft of the wheel in a longitudinal direction of the vehicle.

2. The driving wheel structure of claim 1, wherein:
    the first and second motors are driven in the same direction when rotating the wheel in said one direction;
    the first support member comprises an arm-shaped member in which one end is secured to a stator of the first motor and the other end is pivotally attached to the vehicle body;
    the second support member comprises an arm-shaped member in which one end is secured to a stator of the second motor and the other end is pivotally attached to the vehicle body; and
    the first and second support members are respectively disposed such that the momentary centers of swing movement of the first and second support members lie on opposite sides of the axle shaft of the wheel in the longitudinal direction of the vehicle.

3. The driving wheel structure of claim 2, wherein the first and second motors are coaxial motors provided on the axle shaft.

4. The driving wheel structure of claim 2, wherein:
    output shafts of the first and second motors are offset from the axle shaft of the wheel respectively and include power transmission mechanisms that transfers the drive torques generated in the output shafts to the axle shaft; and
    each of the power transmission mechanisms includes a first gear affixed to the output shaft of each of the first and second motors, a second gear secured to the axle shaft in a non-engaging relationship with the first gear, and a third gear that engages both of the first and second gears.

5. The driving wheel structure of claim 4, wherein:
    the first support member is comprised of a hollow member; and
    the power transmission mechanism of the second motor is accommodated within the first support member.

6. The driving wheel structure of claim 2, wherein:
    output shafts of the first and second motors are offset from the axle shaft of the wheel respectively and include power transmission mechanisms that transfers the drive torques generated in the output shafts to the axle shaft; and
    each of the power transmission mechanisms includes a first gear affixed to the output shaft of each of the first and second motors and a second gear secured to the axle shaft that engages the first gear.

7. The driving wheel structure of claim 6, wherein:
    the first support member is comprised of a hollow member; and
    the power transmission mechanism of the second motor is accommodated within the first support member.

8. The driving wheel structure of claim 1, wherein:
    the first and second motors are adapted to be driven in different directions when rotating the wheel in said one direction;
    the first support member comprises an arm-shaped member in which one end is secured to which a stator of the first motor and the other end is pivotally attached to the vehicle body;

the second support member comprises an arm-shaped member in which one end is secured to which a stator of the second motor and the other end is pivotally attached to the vehicle body; and the first and second support members are respectively disposed such that the momentary centers of swing movement of the first and second support members lie to one side of the axle shaft of the wheel in the longitudinal direction of the vehicle.

9. The driving wheel structure of claim 8, wherein:

the first motor is comprised of a coaxial motor provided on the axle shaft of the wheel;

the second motor includes an output shaft that is offset from the axle shaft of the wheel and includes a power transmission mechanism that transfers the drive torque generated in the output shaft to the axle shaft; and the power transmission mechanism includes a first gear affixed to the output shaft of the second motor and a second gear secured to the axle shaft that engages the first gear.

10. The driving wheel structure of claim 9, wherein:

the first support member is comprised of a hollow member; and the power transmission mechanism is accommodated within the first support member.

11. The driving wheel structure of claim 8, wherein:

the first motor includes an output shaft that is offset from the axle shaft of the wheel and includes a first power transmission mechanism that transfers the drive torque generated in the output shaft of the first motor to the axle shaft;

the first power transmission mechanism includes a first gear affixed to the output shaft of the first motor, a second gear secured to the axle shaft in a non-engaging relationship with the first gear, and a third gear that engages both of the first and second gears;

the second motor includes an output shaft that is offset from the axle shaft of the wheel and includes a second power transmission mechanism that transfers the drive torque generated in the output shaft of the second motor to the axle shaft; and the second power transmission mechanism includes a fourth gear affixed to the output shaft of the second motor and a fifth gear secured to the axle shaft that engages the fourth gear.

12. The driving wheel structure of claim 11, wherein:

the first support member is comprised of a hollow member; and the second power transmission mechanism is accommodated within the first support member.

13. The driving wheel structure of claim 11, wherein:

the second support member is comprised of a hollow member; and the first power transmission mechanism is accommodated within the second support member.

14. The driving wheel structure of claim 1, further comprising a controller that controls actuation of the first and second motors, wherein the controller controls the actuation of the first and second motors such that, when the motor vehicle makes a straight drive, a downward bias force applied to the wheel by the reaction torque of the first support member, which is induced by the drive torque of the first motor, is equal to an upward bias force applied to the wheel by the reaction torque of the second support member, which is induced by the drive torque of the second motor.

15. The driving wheel structure of claim 1, further comprising a controller that controls actuation of the first and second motors, wherein:

the controller controls the actuation of the first and second motors such that, when damping an up-down movement of the vehicle body when the vehicle is moving, the drive torques generated by the first and second motors that rotate the wheel act in opposite directions with respect to the wheel; and the controller also controls the actuation of the first and second motors such that, responsive to the up-down movement of the vehicle body in the vehicle travel process, the oppositely acting drive torques are simultaneously reversed in their acting directions.

16. The driving wheel structure of claim 1, further comprising a controller that controls actuation of the first and second motors, wherein the controller controls the actuation of the first and second motors such that the drive torques generated by the first and second motors that rotate the wheel act in opposite directions with respect to the wheel, and further the controller controls the actuation of the first and second motors such that, when a motor vehicle is turning, a downward bias force is exerted on the wheel if the wheel serves as an outer turning wheel, while an upward bias force is exerted on the wheel if the wheel serves as an inner turning wheel.

17. The driving wheel structure of claim 1, wherein the first support member includes an arm-shaped member in which one end is secured to a stator of the first motor and the other end is pivotally attached to the vehicle body, and the second support member includes a first and second torque arm in which a first end of the first torque arm is secured to a stator of the second motor, a second end of the first torque arm is pivotally attached to a first end of the second torque arm, and a second end of the second torque arm is pivotally attached to the vehicle body.

18. The driving wheel structure of claim 17, wherein an output shaft of the second motor includes a gear that is accommodated within the first support member.

19. The driving wheel structure of claim 18, wherein the second motor is supported on the vehicle body by a four-bar linkage that includes the first support member, the first torque arm, and the second torque arm.

* * * * *